US007627829B2

(12) United States Patent
Roberts et al.

(10) Patent No.: US 7,627,829 B2
(45) Date of Patent: Dec. 1, 2009

(54) COMMAND CENTER AND INTERFACE FOR WEB BASED BUSINESS MERCHANDISING AND SERVICE

(75) Inventors: Timothy Roberts, San Francisco, CA (US); Jason R. Rupp, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1008 days.

(21) Appl. No.: 10/800,128

(22) Filed: Mar. 11, 2004

(65) Prior Publication Data

US 2005/0076132 A1 Apr. 7, 2005

Related U.S. Application Data

(60) Provisional application No. 60/504,084, filed on Sep. 19, 2003.

(51) Int. Cl.
G06F 3/00 (2006.01)
(52) U.S. Cl. .................. 715/762; 715/763; 715/764; 715/789
(58) Field of Classification Search ............. 715/962, 715/781, 762, 763, 764, 789
See application file for complete search history.

(56) References Cited

U.S. PATENT DOCUMENTS

| | | | | |
|---|---|---|---|---|
| 5,897,622 | A * | 4/1999 | Blinn et al. ............... | 705/26 |
| 6,081,263 | A | 6/2000 | LeGall et al. | |
| 6,278,449 | B1 * | 8/2001 | Sugiarto et al. ............. | 715/826 |
| 6,401,085 | B1 * | 6/2002 | Gershman et al. ............... | 707/4 |
| 6,819,343 | B1 | 11/2004 | Sobeski et al. | |
| 7,152,207 | B1 * | 12/2006 | Underwood et al. ......... | 715/207 |
| 2004/0098315 | A1 * | 5/2004 | Haynes et al. ................. | 705/26 |

OTHER PUBLICATIONS

Wu et al., 2003, "A Framework for Classifying Personalization Scheme Used on e-Commerce Websites," Proceedings of the 36th Hawaii International Conference on System Sciences, Jan. 6-9, 2003, published by IEEE Computer Society, 12 pages.
Dezhi Wu; II Im; Tremaine, M.; Instone, K.; Turoff, M.; A framework for classifying personalization scheme used on e-commerce websites. System Sciences, 2003. Proceedings of the 36th Annual Hawaii International Conference on, Jan. 6-9, 2003 pp. 222-233.
PCT International Search Report for International Application No. PCT/US2004/030150 dated Jan. 13, 2005.
Written Opinion of the International Searching Authority for International Application No. PCT/US2004/030150 dated Jan. 13, 2005.
PCT International Preliminary Report on Patentability for International Application No. PCT/US2004/030150 dated Mar. 21, 2006.

* cited by examiner

*Primary Examiner*—Boris Pesin
(74) *Attorney, Agent, or Firm*—Brinks Hofer Gilson & Lione

(57) ABSTRACT

A user interface allows centralized creation and management control for a business having one or more web site storefronts engaged in commerce through the Internet. The interface is for use within a web browser and includes a first display area and a second display area. The first display area is for presenting access to two or more control panels to create, manage (or maintain) and operate a web site for the small business engaged in commerce of at least one of goods or services. The second display area is visually distinguished from and concurrently displayed with the first display area, and provides information associated with the commerce involving the web site.

41 Claims, 11 Drawing Sheets

YAHOO! SMALL BUSINESS Welcome, jason_rupp_43    Settings — 450
[ Sign Out, Account Info ]    Small Business Home - Yahoo! - Help

Manage My Services    [Mail]

| Small Business Home | Products & Solutions | Resources | About Us |

— 460a    — 410a    410e — qarpc22.biz: Merchant Professional  |  Promote your Business
Go To:  Quick Access Tools:  (icon) Merchant Professional
Store Manager  Getting Started and Info
Web Hosting Control Panel  Check Email
Disk Space used: 93%  Compose Email
Buy More...  View www. qarpc22.biz
Domain Control Panel  Billing Information  430a
Email Control Panel
420a  Change Plan | Add Extras

- Special offers
- Email Marketing
- Inktomi Search Submit
- Yahoo! Sponsor Listings
- Overture
- Yahoo! Express — 460b    — 410b qarpc26.us: Web Hosting Professional
Go To:  Quick Access Tools:  (icon) Web Hosting Professional
Web Hosting Control Panel  Check Email
Domain Control Panel  Compose Email
Email Control Panel  View www. qarpc26.us
  Billing Information  430b
420b  Change Plan | Add Extras

Yahoo! Express
Fast-track your Yahoo!
Directory submission and
reach one of the web's
Largest audiences
Guaranteed response in 7
business days. $299/year
Learn more — 460c    — 410c qarpc31.net: Domains
Go To:  Quick Access Tools:  (icon) Domains
Domain Control Panel  View Site
  Billing Information  430c
420c

Yahoo! Product Submit
Save 20% on Yahoo!
Shopping listings
- Millions of qualified customers
- Fixed price-per-click
- Easy management
Learn more — 460d    — 410d jasonrupp.biz: Business Mail
Go To:  Quick Access Tools:  (icon) Business Mail
Email Control Panel  Check Email
  Compose Email
  Billing Information  430d
420d  Change Plan | Add Extras — 440c Views
100
    Time
0  1  2 ••• t
WIDGET.COM PAGE VIEWS

ACTIVE:
WWW.WIDGETS.COM

INACTIVE:
WWW.HIWIDGET.COM
WWW.OVERSTOCK.COM

ACTIVE DOMAINS
    — 440a

403

| T | Q | RCV TOT |
|---|---|---------|
| 0 | 0 | 0 |
| 1 | 100 | $500 |
| 2 | 50 | $250 |
| 3 | 75 | $375 |

SALES ON WIDGET.COM
440b —

FIG. 4b

YAHOO! SMALL BUSINESS Web Hosting

Welcome, jasontest2002
[Sign Out, Account Info]  Settings  Small Business Home - Yahoo! - Help 510d jasonrupp.info: Web Hosting Starter Mail | Manage My Services Small Business Home | | Domain | Web Hosting | Store

Web Site Accounts
▶ jasonrupp.info

[Add New Service]

My Service
View My Site -
www.jasonrupp.info

Edit Email Accounts

Service Options

Service Announcements

Disk Space (MB)
0% ▭▬▬▬▬ 100%
Total: 50.0
Used: 0.0
Extra: 0.0
Available: 50.0

Buy More Disk Space

Data Transfer (MB)
0% ▭▬▬▬▬ 100%
Monthly Limit: 20,000.0
Last Month: 0.0
This Month: 0.1
Forecast: 0.5
(Forecast estimates total data transfer usage for current month.)

Buy More Data Transfer
What is Data Transfer?

Web Addresses
Domain
jasonrupp.info
www.jasonrupp.info

Subdomains
(none)

[Edit]

Build My Web Site
Choose from a host of site building options.

Yahoo! SiteBuilder New!
Easy-to-use for building business web sites.
- Take our Feature Tour
- Browse the Template Gallery

- Other free tools: PageBuilder, Quick & Easy Wizards
- FrontPage® 2002: Manage subwebs and authors More tools ...

Enhance My Web Site
Choose features and functionality to improve your site.
- Password Manager
  - Control access to your site.
  - Manage FTP accounts.
- Subdomain Manager - Create info.your-name.com.
- Site Search - Let visitors find information.
- Custom Error Pages - Help lost visitors find their way.
- Web Site Add-Ons - Headlines, Maps, Counters, Stock Quotes, Weather, and more

Promote My Web Site
Learn about services to attract shoppers to your web site.
Exclusive discounts available.
- Overture, Yahoo! Express, Google - Search engine ads and directory listings
- infoUSA - Direct marketing lists
- KeyWordMax - Online ad tracking More services...

510b  510a  510c

Maintain My Web Site
File Manager
Create directories, edit code, password protect, and more.

Open showing these files:
☑ html ☑ gif ☑ jpg ☑ other

[Open File Manager]

Source Code Editors
HTML | Text

Expert Web Site Tools
Upload / FTP Access
Transfer files from your computer.

Site Statistics
Access your site's traffic reports.

Help & Resources
· Tools Overview
· Customer Support

"Search Engine Tools"
Submitnet Free Trial
Get a 90 day free trial from Submitnet and submit your site to over 200 search engines. Learn more.

Site Promotion Tools
New! Email marketing tools from GotMarketing. Get 90 days free!
Learn more    Existing customers Privacy Policy - Copyright Policy - Terms of Service - Additional Terms - Help

FIG 5b

YAHOO! SMALL BUSINESS Store
Welcome, jasontest2002
[ Sign Out, Account Info ]   Small Business Home - Yahoo! - Help jasontest2002-store: Store                                          Mail | Manage My Services
Small Business Home                                    Domain | Web Hosting | Store Your Yahoo! Store is not open. Please open your account soon.

| 515a | 515b | 515c | 515d | 515e |
|---|---|---|---|---|
| Edit | Process | Statistics | Order Settings | Site Settings |
| Simple | Orders | Page Views | Order Form | Account Info |
| Regular | Requests | Sales | Fax/Email | Access |
| Advanced | Oracle Small Business | References | Shipment Status | Preferences |
| Upgrade My Editor | Gift Certificates | Searches | Configure Inventory | Domain Names |
| | | Shopping Searches | Pay Methods | Customer Access |
| | | Graphs | Ship Methods | Ratings |
| | | Click Trails | Ship Rates | |
| | | Reports | Tax Rates | |
| | | Repeats | Foreign Orders | |
| | | | Test | |
| | | | Auctions Checkout | |
| | | | Publish Order Settings* | |

515f

Promote
Email Marketing
Cross-Sell
Create Links
Track Links
Coupon Manager
Mailing Lists
Search Engines
Yahoo! Directory
Yahoo! Shopping
Affiliate Program

515g

Statistics at a Glance (last 120 days)

Page Views          0.00 Revenue

Customer Ratings
No ratings yet. [Info]

Go
Published Site
Merchant Resources
Y! Store User Guide
System Status

Help Us Improve Y! Store
Join our User Research Program
Submit a Suggestion

Privacy Policy - Copyright Policy - Terms of Service - Help

FIG 5e        525

COMMAND CENTER AND INTERFACE FOR WEB BASED BUSINESS MERCHANDISING AND SERVICE

RELATED APPLICATIONS

This application claims a priority benefit under 35 USC § 119(e) to U.S. Patent Application 60/504,084 filed Sep. 19, 2003, the contents of which are herein incorporated by reference.

BACKGROUND OF THE INVENTION

1. Field of the Invention

The present invention relates to a command center and user interface for web based businesses merchandising and/or services.

2. Description of the Related Art

The transfer of information over computer networks has become an increasingly important means by which institutions, corporations, and individuals do business. Computer networks have grown over the years from independent and isolated entities established to serve the needs of a single group into vast Internets that interconnect disparate physical networks and allow them to function as a coordinated system. Currently, the largest computer network in existence is the Internet. The Internet is a worldwide interconnection of computer networks that communicate using a common protocol. Millions of computers, from low-end personal computers to high-end super computers, are connected to the Internet.

The Internet has evolved to serve a variety of interests and forums. In particular, the Internet is rapidly transforming into a global electronic marketplace of goods and services as well as of ideas and information. This transformation of the Internet into a global marketplace was driven in large part by the introduction of an information system known as the World Wide Web ("the web"). The web is a distributed database designed to give wide access to a large universe of documents. The database records of the web are in the form of documents known as web pages. These web pages typically reside on web servers and are accessible via the Internet. Computers connected to the Internet may access the web pages via a program known as a web browser, which has a powerful, simple-to-learn graphical user interface. One powerful technique supported by the web browser is known as hyperlinking, which permits web page authors to create links to other web pages that users can then retrieve by using simple point-and-click commands on the web browser.

Web pages may be constructed in any of a variety of formatting conventions, such as Hyper Text Markup Language ("HTML"), and may include multimedia information content such as graphics, audio, and moving pictures. Any person with a computer and a connection to the Internet may access any publicly accessible web page. Thus, a presence on the World Wide Web has the capability to introduce a worldwide base of consumers to businesses, individuals, and institutions seeking to advertise their products and services to potential customers. Furthermore, the ever increasing sophistication in the design of web pages, made possible by the exponential increase in data transmission rates and computer processing speeds, makes the web an increasingly attractive medium for advertising and other business purposes, as well as for the free flow of information.

The availability of powerful new tools that facilitate the development and distribution of Internet content has led to a proliferation of information, products, and services offered on the Internet and dramatic growth in the number of consumers and businesses using the Internet. Commerce conducted over the Internet has grown and is expected to continue to grow dramatically. As a result, the Internet has emerged as an attractive new medium for businesses and businesses of information, products and services to reach these large numbers of consumers for sales of this information, products and services.

In particular, small and medium sized businesses, especially those that address highly targeted niche markets, may benefit substantially from advertising on the Internet (or other similar computer networks). The cost of advertising on the Internet can be relatively low compared to other media and businesses potentially can reach a very wide audience (or a highly targeted audience) and help drive sales. However, traditional advertising channels for advertising through the Internet are not well suited to address smaller businesses. A direct sales force cannot cost efficiently reach businesses that want to place only a limited number of ads or that only want to spend a relatively low dollar amount on advertising.

When businesses do advertise and sell on the Internet, access to data and information on sales corresponding to their advertising information and associated sales information is not available on a per domain name site basis. Rather, this data often is found only with the domain name site or is found on disparate web sites separate from the domain name site. Hence, businesses conducting business on more than one domain name site must query each site individually or must locate all web sites where such data resides in order to gather all information pertinent to their business. Moreover, the disparate nature of accessing the information creates confusion and reduces productivity when interfacing with the sites having the data.

An associated problem with disparate web sites for information is a lack of real-time data simultaneously available to the user. Because such data is not available real-time within one location, when the user completes toggling through the multitude of web sites to collect all the business information, the initial information the user retrieved has become stale. Thus, the user no longer has accurate current information on their advertising and sales data.

In addition, other business related information is also located in disparate web sites throughout the Internet. Creating a web page with links still requires a user to toggle through each web site. Further, when data is collected and displayed on a web site, for example, stock quotes or weather information, such data is merely pulled and formatted from generic databases and is not information specific to the business, such as advertising or sales results because this data is typically on disparate web sites.

Therefore, there is a need for a command center and user interface for web-based businesses conducting merchandising and service offerings over a communications network, for example, the Internet.

SUMMARY OF THE INVENTION

The present invention overcomes the limitations of the prior art by providing a computerized platform that allows a user (e.g., an owner or manager of a small or medium size business) to customize a user interface interconnected with the World Wide Web ("www" or "web") with information (e.g., links to domain, data from disparate domains, etc.) that is specific for that user's organization. The user interface is advantageous for the user because it provides a substantially single interface for access to information that is particular to the organization and the user (or users) using the interface and analyzing the information. Hence, the user receives the benefit of having all information pertinent to the organization within the substantially single interface without having to toggle among multiple web site locations to gather it. Moreover, a user gets a familiar look and feel to the front end of this information.

Generally, the present invention includes a user interface that includes links to and data from one or more domain sites through which the user's organization is conducting business. For example, the user interface aggregates and presents business specific data for the organization such as Internet advertising and/or sales data from multiple domain sites on the web. Hence, the user has organization wide data available within a substantially single user interface.

In one embodiment, the present invention includes a first level user interface (or command center) for use within a web browser to centralize information relating to creation and management of a business conducted through a network. In this embodiment, the business presence on the network may be referred to as a store (or storefront). It is noted that in one embodiment, the physical back-end operation of the storefront (e.g., servers, network devices, network lines, storage, etc.) is typically is not owned by the business operating the storefront, although the logical operation (the user experience in shopping through the storefront) allows a business to leverage these resources to operate their business online.

Referring back to the user interface, the first level user interface includes a first display area and a second display area. The first display area presents access to one or more control panels to create and manage a web site for a small business engaged in commerce of goods and/or services. The second display area, which is visually distinguished from and concurrently displayed with the first display area, provides information associated with the commerce involving the web site. The first level user interface may also include a third display area, which is visually distinct from and concurrently displayed with the first display area and the second display area, to present fixed (e.g., billboard-type) information that may be of use for the business, for example, advertising services offered by the site hosting the user interface.

The first display area of the first level user interface is configured to include one or more modules. Each module includes access to at least one control panel. The control panels are a second level user interface and are the primary tools the business user uses to create and manage a store that would be engaged in commerce over the Internet. An example of a module is web hosting. The web hosting module provides access to control panels through which a business creates, manages, maintains and operates a web site used to engage in commerce with customers.

In one embodiment, the web hosting module provides access to a web hosting control panel, a domain control panel and a business mail control panel. The domain control panel provides an interface to access tools to obtain, import, and/or manage a domain on the web (e.g., widgetworld.yahoo.com). The web hosting control panel provides an interface to tools to build, manage and maintain (e.g., promote, activate, deactivate, enhance), and operate a site for business. The business mail (electronic mail) control panel provides an interface to tools to create, manage/maintain, and operate electronic mail mailboxes, messaging, and associated functionality.

The second display area in the first level user interface provides information that is specific to the business. For example, the second display area allows for display of statistics relating to page views of a domain for a store, sales data associated with a store, inventory data, click rates on the domain, and the like. The data may be displayed in substantially real time or may be set to refresh at predetermined intervals. Further, the business user may present data in a variety of formats (e.g., graphical, tabular, and streaming) that are selectable by the business user.

The present invention provides a benefit of allowing a user to create and manage a commerce operation on the Internet through a web based user interface structured to incorporate relevant control panels and information for commerce operations in an integrated environment. Moreover, because all the relevant information is integrated within the user interface, the business has the advantage of retrieving and/or controlling the most relevant information for itself available without having to traverse multiple web sites for the control panels and information. Further, the user interface provides a uniform view so that a business user has a familiar look and feel in a web environment to gain access to tools and information for operations of the business.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

FIG. ("FIG.") 1 is a block diagram of an example network based system suitable for use in accordance with one embodiment of the present invention.

FIGS. 4a and 4b are examples of command center user interfaces in accordance with one embodiment of the present invention.

FIGS. 5a through 5e are examples of control panel interfaces in accordance with one embodiment of the present invention.

DETAILED DESCRIPTION OF THE INVENTION

Figure 1:
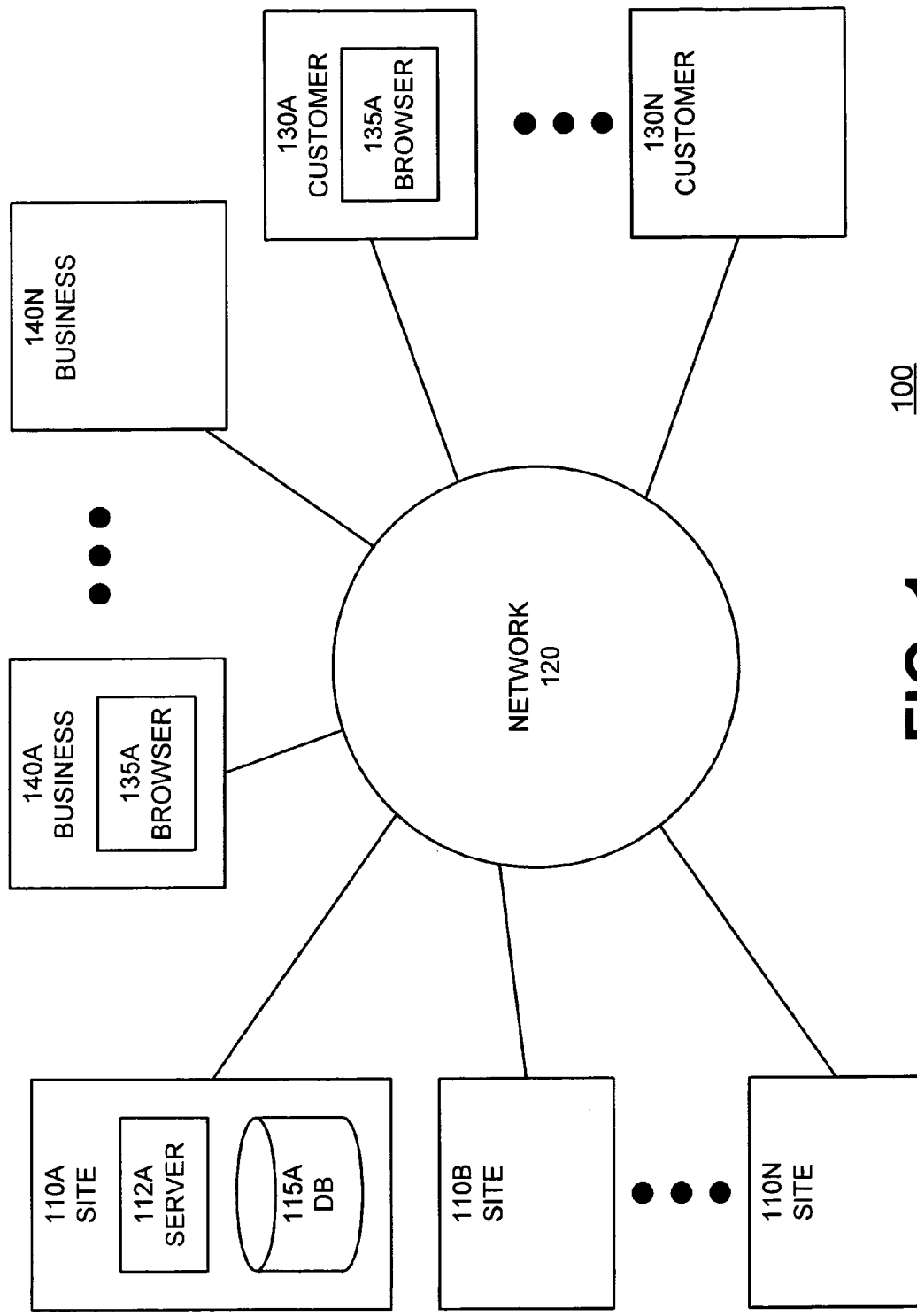

FIG. 1 is a block diagram of an example system 100 suitable for use with the present invention. Generally speaking, the system 100 includes a number of sites 110A-N, customers 130A-N, and businesses 140A-N that communicate with each other over a network 120. The sites 110 provide web pages to the customers 130. The businesses 140 are engaged in online commerce (e.g., sales of merchandise and/or services) over the network through one or more sites 110.

In one specific embodiment, the network 120 is the Internet. The sites 110 include web sites, such as Yahoo!'s various properties: the Yahoo! Main Page, Yahoo! Small Business, Launch!, News, Finance, etc. The customers 130 include individuals who access the Internet, typically through web browsers 135 such as Netscape's Navigator or Microsoft's Internet Explorer. Similarly the businesses 140 also access sites 110 through the web browsers 135. In some cases, the customers 130 and businesses 140 can access the sites 110 using other means, for example by software agents or programmatic interfaces.

The businesses 140 are entities that conduct business over the Internet through one or more sites 110. For example, a business 140 sells goods or services through a Yahoo! site such as Launch! or Small Business. The sites 110 transmit web pages to the customers 130 in response to requests sent from the customers 130. The web pages include information that was placed on that site 110 by the business. The information placed includes merchandise or services being offered by the business. The information may also include advertising, orders, and the like. A generalized site architecture is shown in simplified form in 110A. A web server 112 provides an interface to the Internet and a database 115 contains information about the different components (e.g., content and ads) used to compose pages. The components themselves may or may not be included as part of the database 115.

FIG. 1 is simplified for clarity. For example, the sites 110, customers 130 and businesses 140 are shown as separate entities. In fact, the same entity may play one or more roles. Entities may also take on different roles in different contexts. In addition, the different roles can be distributed and/or divided among many different entities. For example, in order to compose and serve a page to a customer user 130, a site 110 may request an article from another site, obtain inventory from a third party inventory server, and obtain some graphics and links from its internal database. The site 110 itself may also be distributed for redundancy and/or performance reasons. For example, large sites such as the Yahoo! sites typically run different web properties from different servers and use an architecture that is more sophisticated than that shown in FIG. 1, using for example multiple servers, databases, load balancers, etc.

As further clarification, although the Internet will be used as the primary example in this disclosure, the invention can be used with other systems also. For example, the entities 110, 130 and 140 may communicate with each other over separate communications networks or dedicated communications channels, rather than through the common network 120 of FIG. 1. Alternately, various parts of system 100 may be implemented by mobile components and may not be permanently attached to a communications network. For example, entities may interact with each other via a wireless connection. As a final example, the pages can be based on protocols other than the web, for example, wireless markup language ("WML").

In one embodiment one or more sites 110 include tools for conducting the business. For example, one or more sites 110 may include web site tools for creating the business web site, an inventory and sales tool for tracking inventory and sales associated with the site, a self service advertising tool for creating on-line advertising campaigns, and a web analytics tool for monitoring web activity, for example, click through rates, conversion rates from advertising links, and the like. The sites may operate on disparate properties across the web or within properties owned by a common owner, e.g. Yahoo!.

Figure 2A:
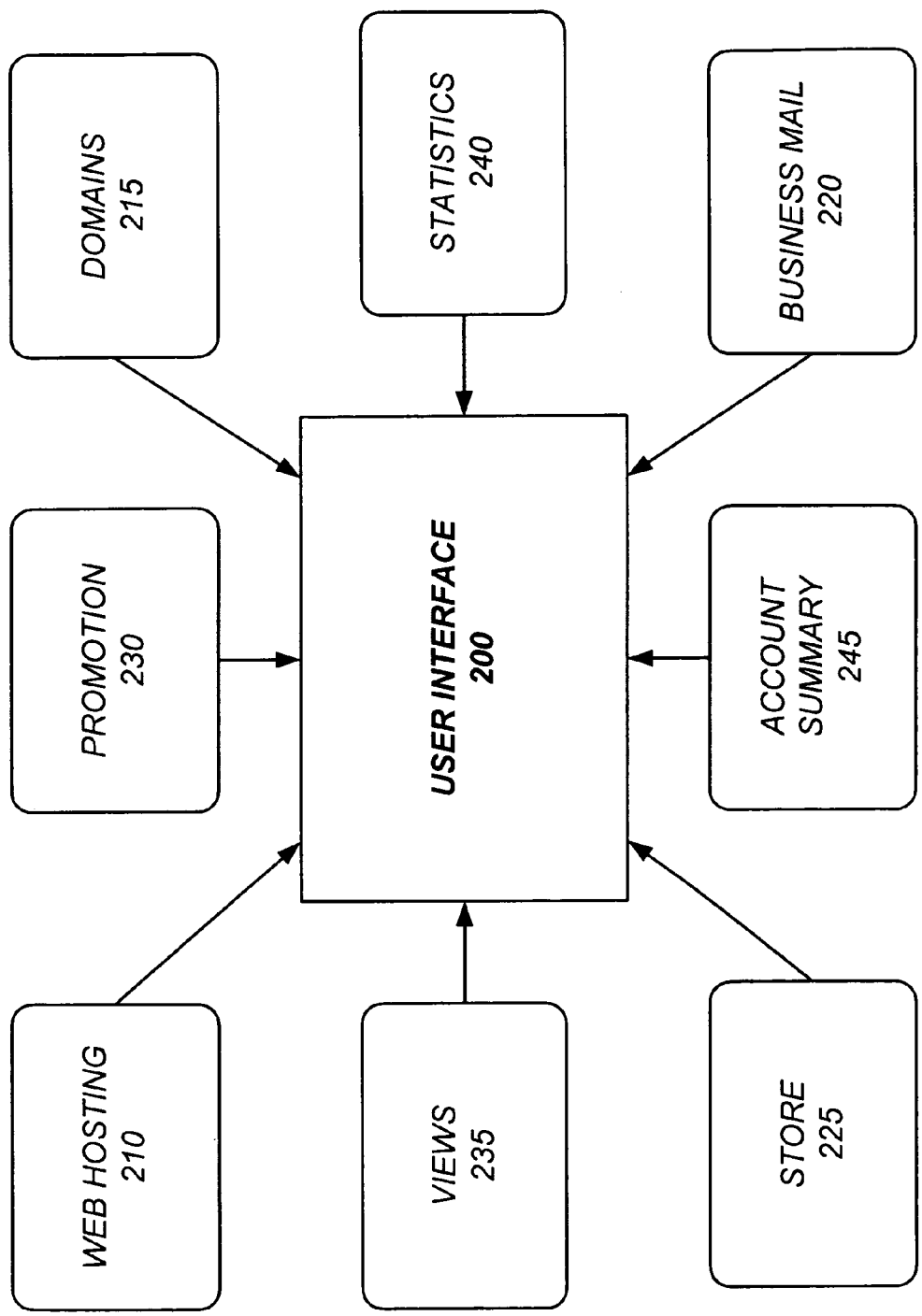
FIG. 2a is a logical view of components of a command center user interface in accordance with one embodiment of the present invention.
Figure 2B:
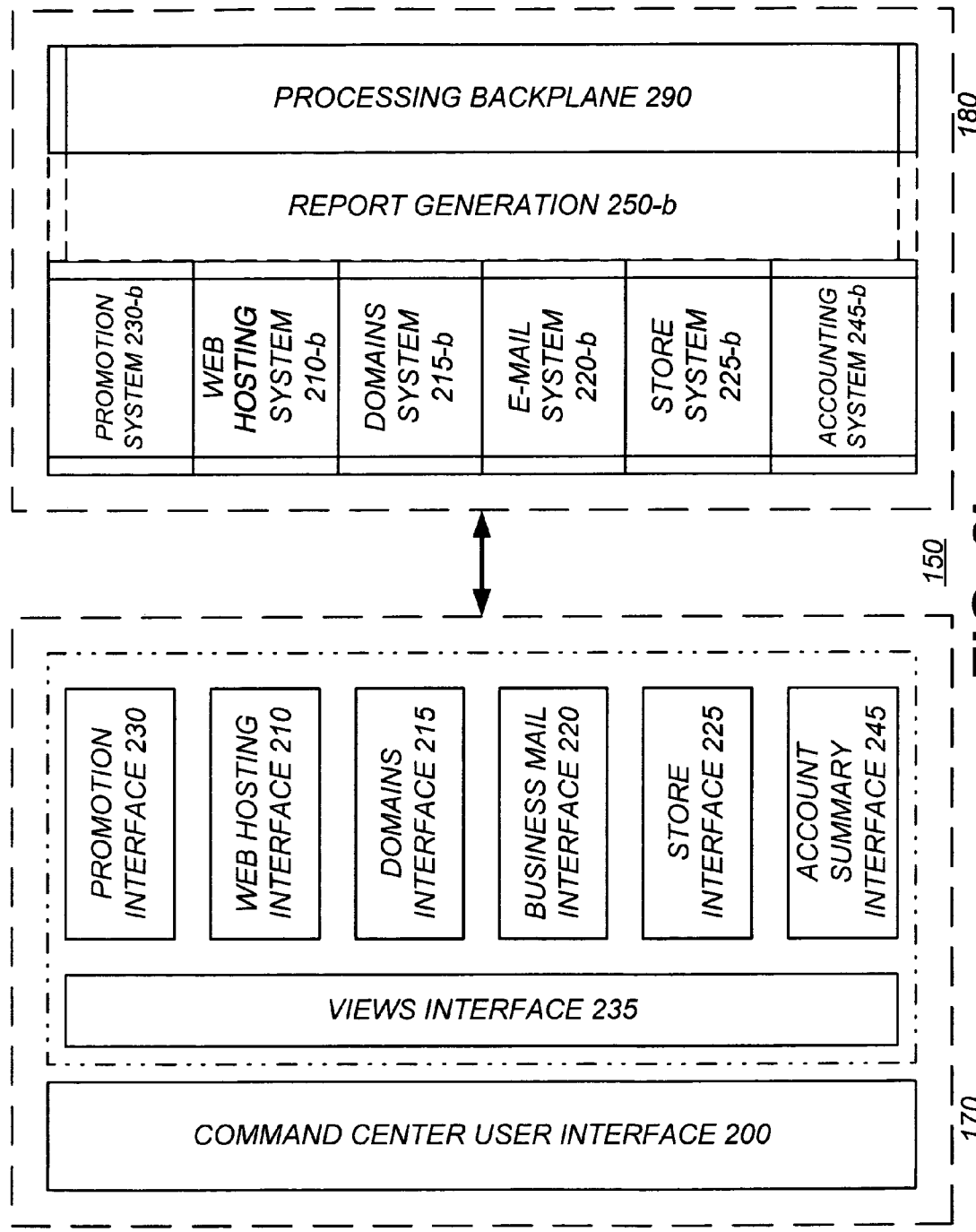
FIG. 2b illustrates a logical view of a site business processing system including a front end and a back end in accordance with one embodiment of the present invention.

Referring now to FIG. 2a and FIG. 2b, FIG. 2a is a logical view of components of a command center user interface (or dashboard) 200 in accordance with one embodiment of the present invention. FIG. 2b illustrates one embodiment of a site business processing system 150 that is configured to include a front end 170 and a back end 180.

The front end 170 includes the command center user interface 200, which comprises a layer through which a business has access to the control panels to gain access to the functionality of systems in the back end. The command center user interface 200 is populated with one or more modules and each module has one or more control panels. Control panels include launch points (e.g., links, executables, scripts) and views (e.g., tables, charts, graphs, streams) for creating, operating, and managing functionality of a site within and on a network.

The embodiment of the command center user interface 200 illustrated in FIG. 2a and FIG. 2b is configured to provide a first level web browser based user interface that includes access to second level user interfaces comprising one or more control panels to create and manage an Internet storefront accessible through web. In this embodiment, the control panels include web hosting 210, domains 215, business mail 220, store 225, advertising 230, views 235, statistics 240, and account summary 245, each of which may provide a layer under the command center user interface 200. It is noted that in one embodiment of the present invention, the physical back-end operation of the storefront (e.g., servers, network devices, network lines, storage, etc.) is typically is not owned by the business operating the storefront, although the logical operation (the user experience in shopping through the storefront) allows a business to leverage these resources as describe herein to operate their business online. Hence, the business owner has the benefit of operating an online business without requiring a large capital investment in resources for it.

Referring back to the user interface, each of the control panels 210, 215, 220, 225, 230, 235, and 240 provides access to a business to particular functionality at the back end 180. For example, the web hosting control panel 210 provides a visual front end to a web hosting system 210-b, the domains control panel 215 provides a visual front end to the domain system 215-b, the business mail control panel 220 provides a visual front end to an electronic mail ("e-mail") system 220-b, and the store manager control panel 225 provides a visual front end to a store management system 225-b. The back end 180 systems are built on a processing backplane 290 (e.g., a conventional data processing system) to provide the processing power for site functionality. In addition, the back end 180 may also include additional systems for site functionality such as a promotional system 230-b, an accounting system 245-b, and a report generation system 250-b (e.g., to generate views and statistics for the front end).

Among the control panels, web hosting 210 is configured to provide a business (e.g., a business owner that would be a user of the user interface 200 and the components it interacts with) with an interface to a web hosting system 210-b. The web hosting system 210-b allows the business to create, manage (including maintain), and operate a web site. For example, tools to create a web site include providing access and/or a link to the domains control panel 215 of the domain system 215-b. The domain system 215-b allows setting up a domain (e.g., the Internet Protocol ("IP") address or Uniform Resource Locator ("URL")) or sub-domain on the web from which the business will operate. The domain rights may be provided in pre-determined manner to the business (e.g., random assignment, first in-first out basis, bid for site name, etc.). Alternatively, the business may request, subject to approval, to a specific domain for a site, e.g., samplestore1.yahoo.com.

Referring back to the web hosting control panel 210 and the web hosting system 210-b, the tools to create a web site may also include an executable program or a link to incorporate and manage an existing domain through the command center user interface 200, e.g., samplestore2.yahoo.com (which may have been obtained by the business at an earlier time from another domain name provider). Additional tools to create a web site include a site builder that is used to create a web site at the selected domain. The web site provides a web-based storefront (e.g., store web page or pages) through which customer end users interact with the business and engage in commerce with the business. The tools for creating sites may be an executable program, links, or uploading of a file (e.g., a pre-configured storefront).

To manage the web site, the web hosting control panel 210 includes launch points and views providing statistical data about one or more "physical" aspects of sites being managed by the business. Examples of the "physical" aspects include information (e.g., data) on storage space, data transfer rates, and active or inactive domains or sub-domains owned and/or controlled by the business. The business uses these interfaces to manage the appropriate levels of resources needed for a particular site, for example, increase disk space at samplestore1.yahoo.com and decrease data transfer rates (e.g., throughput or real-time/batch transfer) at samplestore2.yahoo.com. The web hosting control panel 210 may also include tools such as password management, error correction for web pages, search tools and the like. Thus, a benefit of the web hosting control panel 210 as well as the domains control panel 215 is that it provides a single location for obtaining, creating, managing, and operating a site for a storefront to launch a business engaged in commerce over the Internet.

Turning next to the business mail control panel 220, it provides an interface to the e-mail system 220-b to create, manage, and operate e-mail services for the business. The business mail control panel 220 includes tools to create e-mail addresses and mailboxes for the business. The tools for creating e-mail addresses and mailboxes may be executable programs, links, or file upload processes (e.g., uploading of an address book from an external electronic mail program such as Microsoft™ Outlook). The e-mail addresses and mailboxes may be created for employees and for specific parts of a business (e.g., customer service, technical support, etc.), without requiring the business to purchase, maintain and manage an electronic mail system at their site.

The business mail system 220-b may be configured to communicatively couple with the web-hosting system 210-b through the processing backplane 290 in a seemless manner from the business' perspective. This may be pre-configured by the site business processing system 150. Alternatively, the business may select which back end 180 systems to link together through the processing backplane 290.

As an example, a business may desire to integrate e-mail addresses into a site for customer end users to contact the business through the site for particular inquiries. The business can create an e-mail address 'customerservice' (e.g., customerservice@storefront1.yahoo.com) through the business mail control panel 220. Through the web hosting interface 210, the business also configures where the address is placed on the site and defines it as a link. When processing backplane 290 receives this e-mail address it automatically posts and activates the e-mail on the site through the web hosting system 210-b. Thereafter, when a customer user has a question about a purchase of a product in the site store, that customer user may select (or click) on the 'customerservice' link to transmit a question directly to the 'customerservice' mailbox of the business.

Figure 3:
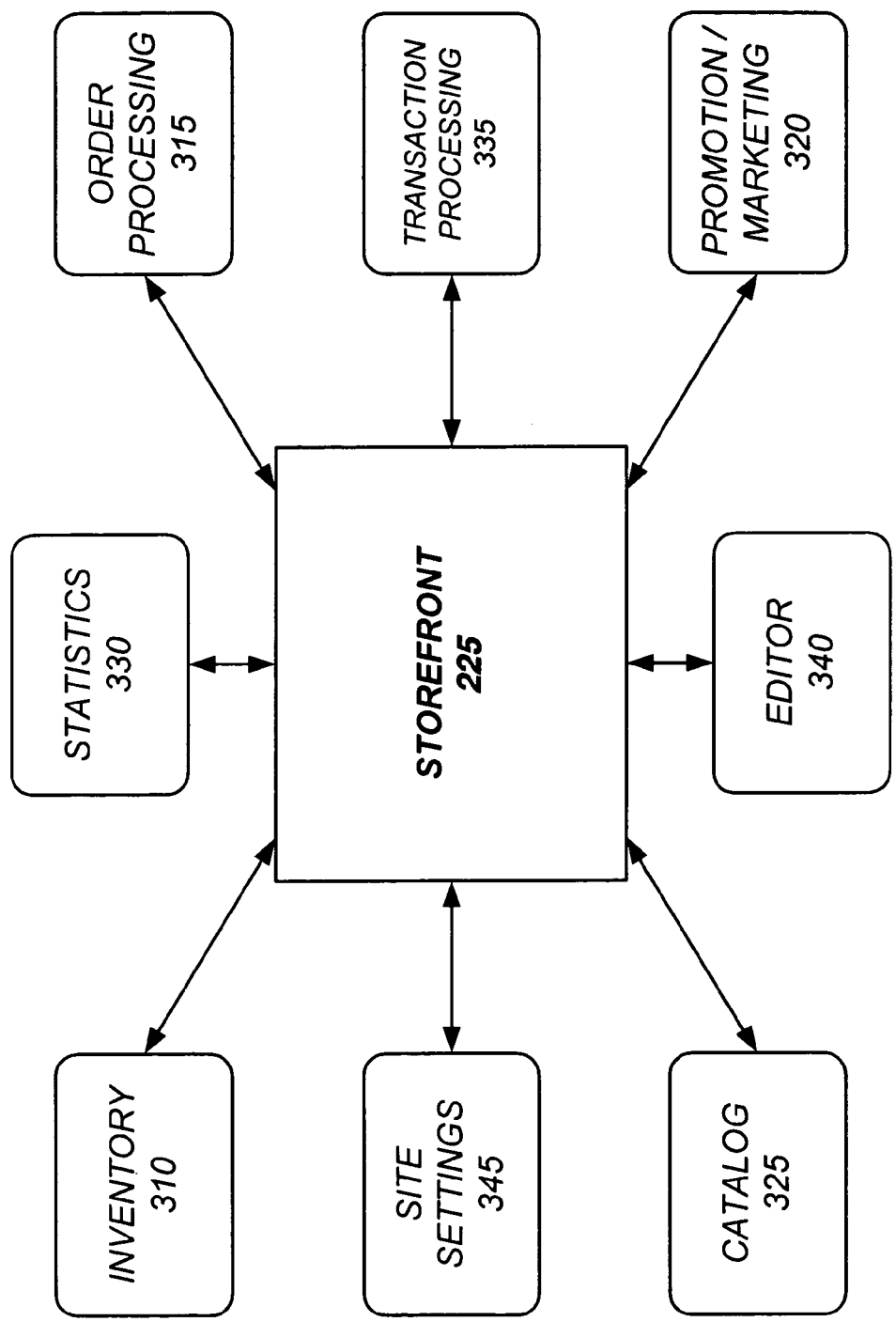
FIG. 3 is logical view of a store control panel for a user interface in accordance with one embodiment of the present invention.

Turning to the store manager control panel 225, it provides a store management interface to a store management system 225-b for the business. The store management system includes tools relating to commerce involving the storefront. As an example, FIG. 3 is logical view of a store manager control panel 225 in accordance with one embodiment of the present invention. In addition, it is noted that the general principles of the logical view of this store control panel 225 would be applicable to other control panels described herein.

As per the logical view in FIG. 3, the store manager control panel 225 includes launch points to the store management system 225-b. In particular, the store manager control panel 225 provides an interface to the store management system 225-b for tools, functions, and information relating to operation of storefront. The tools within the store management system 225-b may be executable programs, links, scripts, or file upload processes (e.g., upload of inventory information from a spreadsheet).

As an example, the store manager control panel 225 includes an interface to the order management of the store management system 225-b. This interface includes an inventory 310 interface and may also include interfaces for shipping status, inventory configuration, pay methods, and ship methods. Other interfaces on the store control panel 225 include an order processing 315 interface is used to process orders for goods (merchandise) and/or services through the store management system 225-b. A promotion 320 interface is used to promote/market the store front through tools such as electronic mail marketing campaigns, cross-selling, mailing lists, listings in web directories and programs. A catalog 325 interface provides catalog type information on goods and services in the storefront to a customer end user.

A statistics 330 interface tracks activity associated with the storefront (e.g., page views, sales, referrals, click trails). A transaction processing 335 allows management of transactions involving orders such as credit card verification and posting, accounts receivables, and the like. The editor 340 interface provides access to tools for editing. The site setting 345 interface provides access to tools for setting storefront site settings for business end users, with a subset of those settings being configurable by a customer user (e.g., to remember the user's preferences when visiting the site).

The store manager control panel 225 beneficially provides a business with a seamless integration of tools and functionality of the store management system 225-b with other back end 180 systems of the site business processing system 150, through the store manager control panel 225. For example, the store manager control panel 225 can also be configured so that when the store management system 225-b is updated, or changed, the domain system 215-b, the web hosting system 210-b, and/or the business mail system 220-b are appropriately updated and/or changed. Thus, a business has a single, comprehensive, interface for their web based storefront.

Referring back to FIG. 2a and FIG. 2b, the command center user interface 200 may be pre-configured or customized for the business user. For example, access to each control panel may be grouped into modules. In one embodiment, modules are comprised of control panel launch points having associated functionality. For example, a web hosting module would include the web hosting control panel for site creation, maintenance, operation, etc. as well as a domains control panel, e.g., to obtain a site domain, and a business mail control panel, e.g., to receive emails associated with the site. A business user may also configure modules by grouping control panel launch points themselves, for example, in a manner most logical to them.

A business user can create subsets of the command center user interface 200 for other users in the business. For example, top management may have a comprehensive set of control panels and/or modules. However, Order Fulfillment managers may only have access to the store manager control panel 225 but not other control panels such as the or the web hosting control panel 210 or domains control panel 215.

The command center user interface 200 may also be configured to include a first display area for control panels and/or modules and a second display area, often visually distinct from the first display area, for data presented through views (e.g., graphical, tablular, streaming text, lists, video, etc.). The views offered would be derived from data extracted from one or more systems in the site business processing system 150. For example, the command center user interface 200 may include a graph showing site page views in 15 minute increments and present inventory status corresponding to those page views. Thus, the business user is able to create and manage the command center user interface 200 to provide information very particular to that business user. A third display area may also be present for information that remains "fixed" or is from other sources. Further, the second-level user interfaces, e.g., control panels, may be similarly configured with respect to display areas.

Figure 4A:
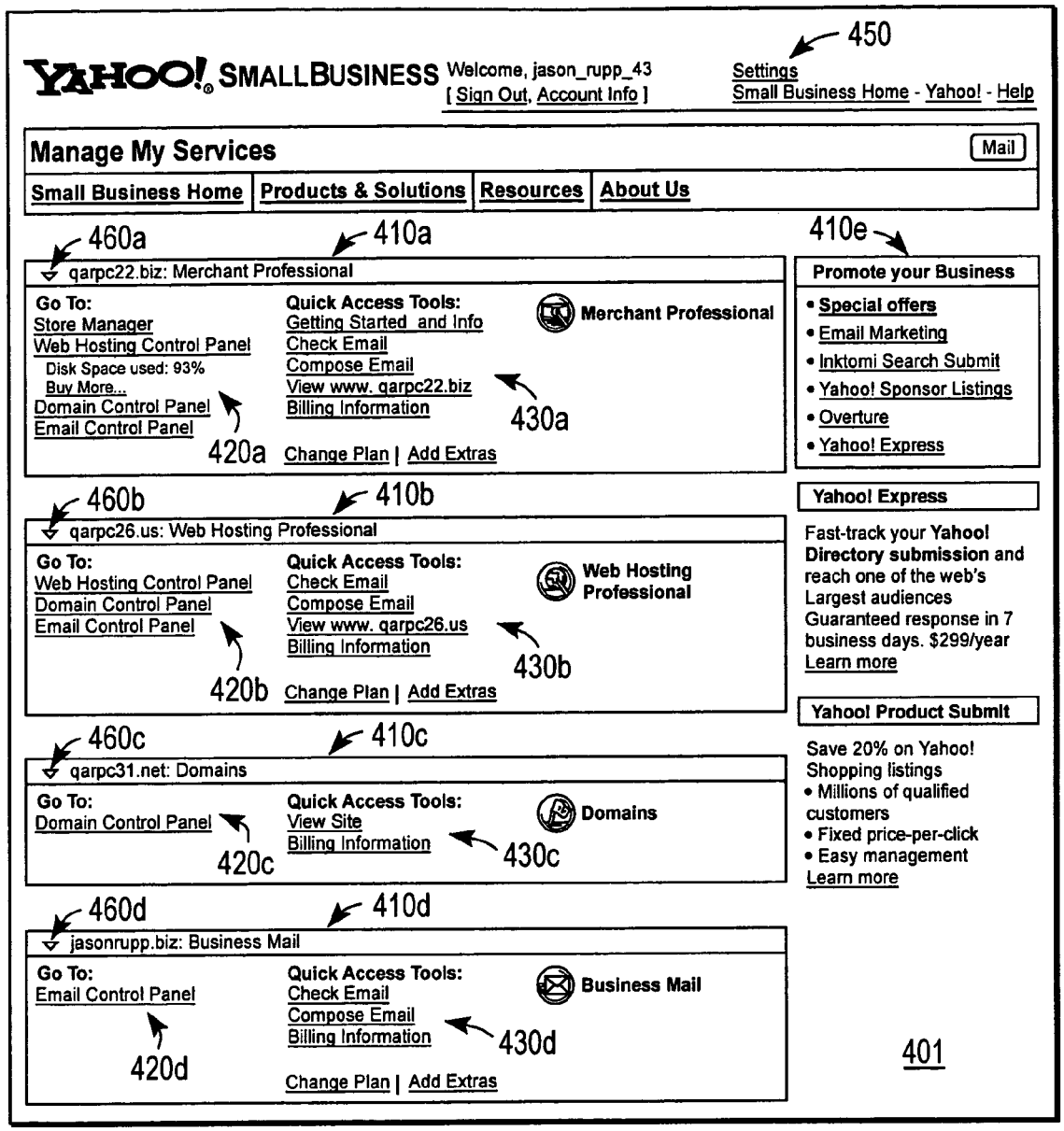

Turning to FIGS. 4A and 4B, these are examples of command center user interfaces 401, 403 in accordance with one embodiment of the present invention. FIG. 4a illustrates a first example of the command center user interface 401 and FIG. 4b illustrates a second example of the command center user interface 403. Both examples, 401, 403 include multiple modules (generally 410) identified as a merchant professional module 410a, a web hosting professional module 410b, a domains module 410c, and a business mail module 410d. A promotional module 410e in these examples provides a launch point (e.g., links, executables, scripts) to a pre-configured site rather than a control panel. The others modules 410a-d in this example includes one or more control panel launch points (generally 420) to that particular control panel. These modules 410a-d also include launch points to specific tools (generally 430) within a variety of control panels, for example, compose an e-mail from the e-mail control panel 220.

Generally the modules and control panels are functionally similar to the modules and control panels previously described. Further, in these examples of the first and the second command center user interfaces 401, 403, the merchant professional module 410a is configured so that a business user may allow it to be the only fully visible module having all the relevant control panels, e.g., web hosting, domains, business e-mail, and store manager/management. The other modules can be configured to be non-visible by selecting such an option in a setting menu 450 or minimizing the module through the minimize icon (generally 460).

The example of the second command center user interface 403 also includes additional areas (generally 440) for presentation of commerce information associated with the business' site. The commerce information may be displayed in any form, for example, text, graphical, or streaming. The commerce information is specific to the business. Further, the business user can configure the specific information to be displayed and the format. For example, a first area 440a may show active sites (e.g., domains) in plain text format, a second area 440b may show sales data on the active sites in tabular format, and a third area 440c may show page views of active sites in graphical format.

Because the business user is able to display information specific to their business, and the user has immediate access to control panels used to run their business, the business user has immediate access to information and tools to efficiently and productively run a web-based business. For example, if present sales data shows a lack of page views, the business user can access the store manager control panel 225 and evaluate click trails to get more information on why this is occurring and if necessary, start an advertising campaign through the promotion control panel 230 to boost sales. Thus, the command center user interface provides a business with a robust set on control panels and associated tools and information for creating, managing, maintaining, and operating a productive, efficient, and successful web-based storefront.

Figure 5A:
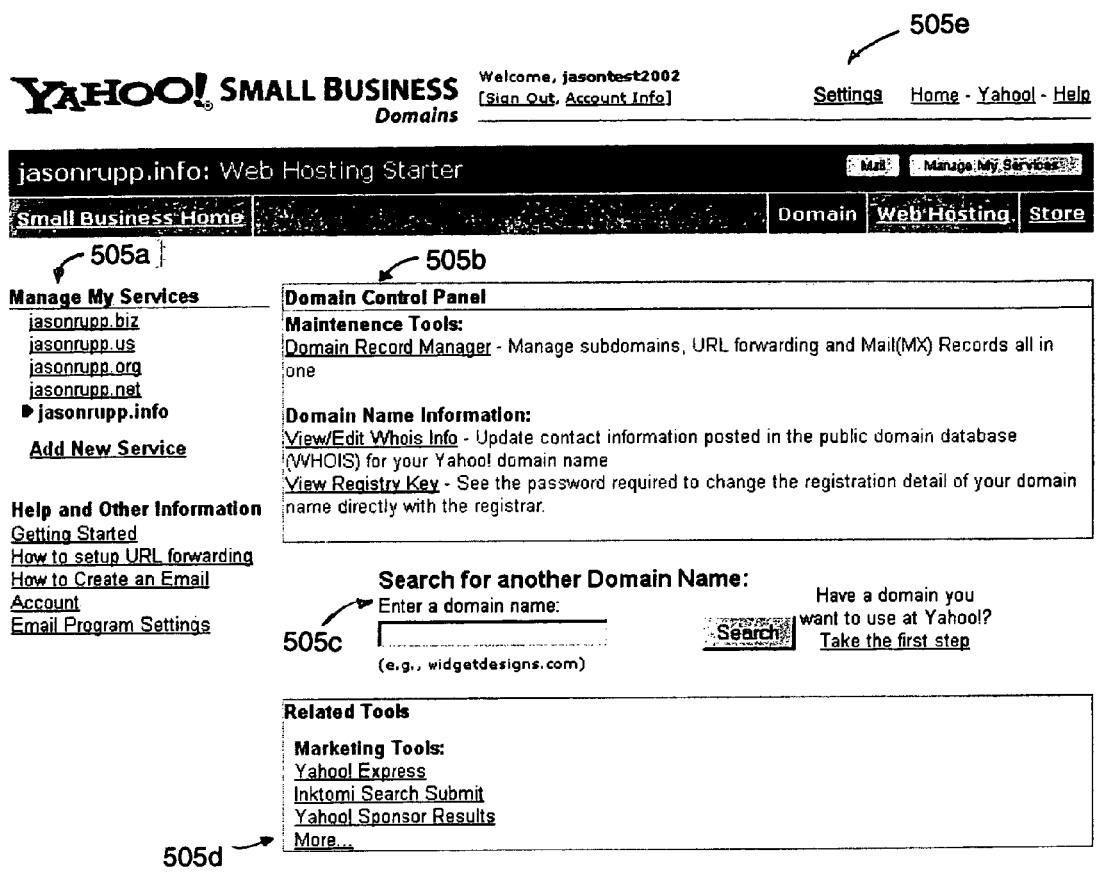

FIGS. 5a through 5e are examples of control panel interfaces in accordance with one embodiment of the present invention. FIG. 5a illustrates a domains control panel 505. In this example, the domains control panel 505 includes a list 505a of domains that can be managed, domain controls 505b for maintenance and domain name specific information (e.g., editing contact information for domain or domain registration details), a search engine front end 505c for searching available domains, and related tools 505d that associated with domain functions. The domains control panel 505 may be further customized to add or delete tools from the control panel through the settings 505e option.

FIG. 5b illustrates an example of a web hosting control panel 510. In this example, the web hosting control panel 510 includes web development and promotion tools 510a for building, enhancing or promoting a web site, site management tools 510b for managing aspects of the web site, for example, disk space, throughput to the site, and domains and subdomains for management, and maintenance tools for maintaining a site, for example, setting up passwords, creating directories, uploading files, obtaining/generating site statistics, editing the site content and layout. Again a user may customize the web hosting control panel 510 by selecting or de-selecting preference options in through a page or window listing such options through a settings 510d launch point.

FIG. 5c illustrates an example of a store manager control panel 515. In this example, the store manager control panel 515 includes tools for accessing various parts of the store management system. Examples of these tools include an editor 515a, order processing 515b, statistical analytics 515c, order settings 515d, site settings for orders 515e, and promotional tools 515f. The store manager control panel 515 also includes an area 515g for viewing particular store management information or subsets of it. The store manager control panel 515, like the other control panels described herein, provides a business user with access to a feature rich business system having a robust back end 180 that is accessible through a centralized front end 170 providing a familiar look and feel to a user when accessing the tools and information from the business system.

Figure 5D:
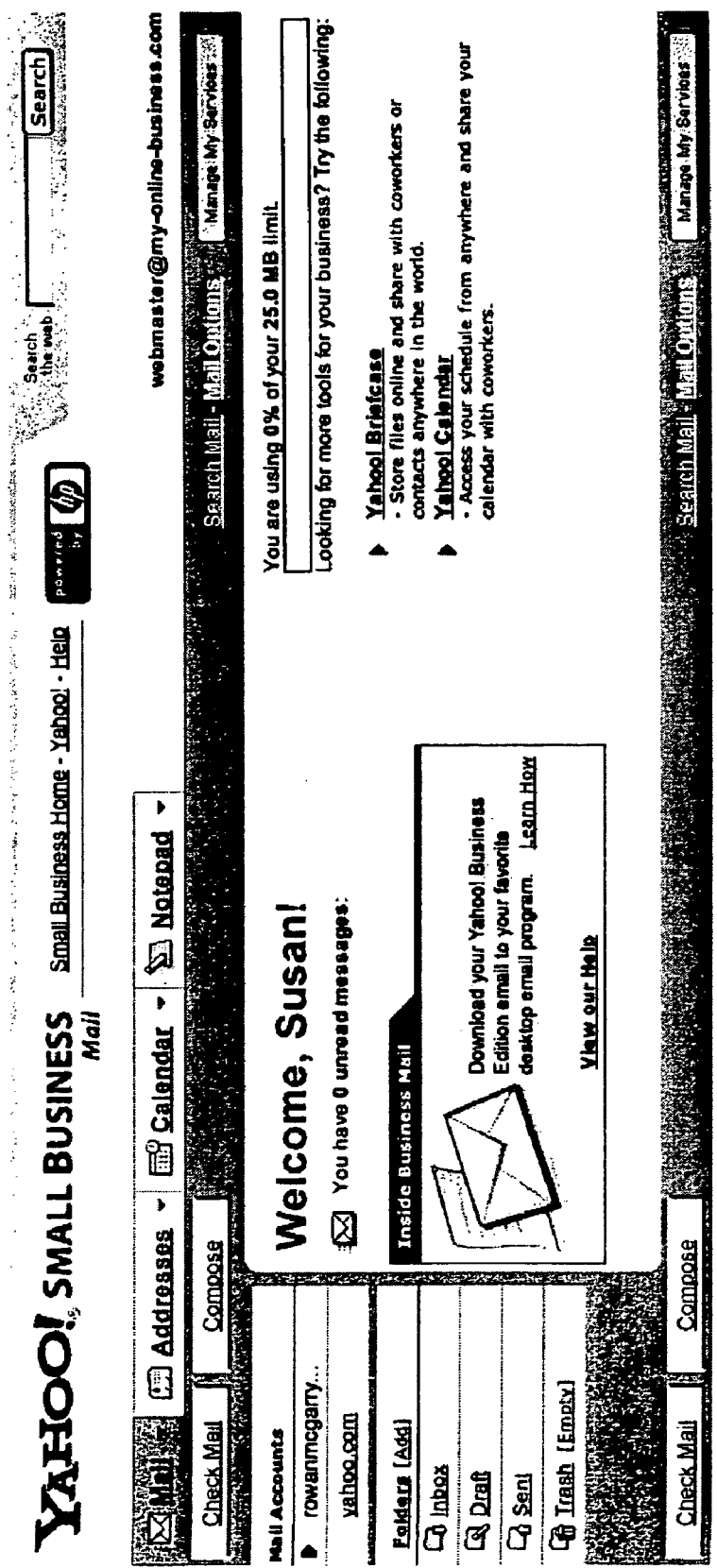

FIG. 5d illustrates an example of an e-mail control panel 520. Again, a business user is provided access to a centralized control panel and a robust back end system to create and operate a full functioning electronic mail system, without having to invest substantial time and monetary resources to independently get such a system up and running. Moreover, the present invention pre-integrates the functionality of the e-mail system and control panels (as well as for the other systems and control panels) for the storefront site. This alleviates the business user from such arduous business software installation, integration, and maintenance tasks.

FIG. 5e illustrates an example of a promotions control panel 525. The promotions control panel 525 includes tools to create advertising campaigns for a storefront. Like the other control panels, the promotions control panel empowers the business user by giving the user self service tools to interface with a robust backend 180 system for creating and operating a storefront site to engage in commerce over the Internet. For example, through the promotions control panel 525, a business user has access to product advertisement tools 525a to advertise products on a cost per click basis, search engine advertisement tools 525b to advertise products on a keyword (or phrase) basis, sponsor advertising tools 525*c* for listings in established web commerce directories, and e-mail advertising tools 525*d* for generating e-mail marketing campaigns. In addition, as with the other control panels, a business user can customize the control panel interface by selecting or de-selecting preference options in through a page or window listing such options through a settings 525*e* launch point.

The present invention provides access to a robust business system through a feature rich command center user interface that provides access to a feature rich set of control panels. The control panels, in turn, are communicatively coupled to a back end of a business system that provides a business with a wide range of tools and processes for creating, managing, maintaining, and operating a web-based storefront that is engaged in commerce over the web. Further, the centralized, intuitive user interfaces allow for a self-service approach for businesses to focus on only the tools and processes relevant for their web based business merchandising and service storefront. In addition, the control panels and associated systems are integrated providing the business with a selectable combination of control panels and associated system that are appropriate for their businesses without the hassles of generating specifications for different systems and then installing, integrating, customizing and maintaining such systems for their business. Thus, because the business user does not have to design, implement, maintain, and operate such systems they are able to achieve substantial savings in time and resources.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A method for building a user interface for simultaneously managing a plurality of web-based storefronts over a network, the method comprising:
    adding a module to a user interface for managing a plurality of web-based storefronts, the module providing access to a plurality of control panels, each control panel providing an interface to create or manage one of the web-based storefronts, wherein at least one control panel displays an identifier of each web-based storefront which is active;
    adding an area to the user interface, the area visually distinguished from and concurrently displayed with the module, the area providing a plurality of statistical data items associated with commerce of each web-based storefront identified in the at least one control panel;
    adding a control panel of the plurality of control panels to the user interface, the control panel visually distinct from and concurrently displayed with the module and the area, and the control panel providing a plurality of advertising services for use in promotion each web-based storefront, the plurality of advertising services comprising at least one of a product advertisement tool, a search engine advertisement tool, a sponsor advertising tool, or an e-mail advertising tool; and
    providing the user interface to a user over a network.

2. The method of claim 1 wherein the product advertisement tool comprises an advertising service for advertising on a cost-per-click basis.

3. The method of claim 1, further comprising adding a plurality of modules to the user interface, each module providing access to at least one control panel of the plurality of control panels.

4. The method of claim 3, wherein a module of the plurality of modules provides access to a store management related control panel, wherein the store management related control panel displays at least one of a shipping status data or an inventory data.

5. The method of claim 3, wherein a module of the plurality of modules provides access to a web hosting related control panel, wherein the web hosting related control panel provides access to a domain registration system.

6. The method of claim 3, wherein a module of the plurality of modules provides access to a mail service, wherein the mail service provides at least one of a tool to create an email address or a tool to create a mailbox.

7. The method of claim 1, wherein the area provides the plurality of statistical data items associated with commerce of each web-based storefront identified in the at least one control panel in substantially real time.

8. The method of claim 7, wherein the plurality of statistical data items displayed in substantially real time comprises at least one of a page view data for each web-based storefront identified in the at least one control panel, a sales data for each web-based storefront identified in the at least one control panel, a click-through rate data for each web-based storefront identified in the at least one control panel. a click trail data for each web based storefront identified in the at least one control panel, or a conversion rate data for each web-based storefront identified in the at least one control panel.

9. The method of claim 7, wherein at least one of the statistical data items is displayed in a graphical form in the area.

10. The method of claim 7, wherein at least one of the statistical data items is displayed in a streaming text form in the area.

11. A computer readable medium having stored therein data representing instructions executable by a programmed processor for managing a business operated through a plurality of web-based storefronts over a network, the computer readable medium comprising instructions operative to:
    presenting a module to a user over a network, the module providing access to a plurality of control panels, each control panel providing an interface to create or manage one of the web-based storefronts for an online business, wherein at least one control panel displays an identifier of each web-based storefront which is active;
    presenting an area to the user over the network, the area visually distinguished from and concurrently displayed with the module and the area providing a plurality of statistical data items associated with commerce of each web-based storefront identified in the at least one control panel; and
    presenting a control panel of the plurality of control panels to the user over the network, the control panel visually distinct from and concurrently displayed with the module and the area, and the control panel presenting a plurality of advertising services for use in promoting each web-based storefront, the plurality of advertising services comprising at least one of a product advertisement tool, a search engine advertisement tool, a sponsor advertising tool, or an e-mail advertising tool advertisement tool, a search engine advertisement tool, a sponsor advertising tool, or an e-mail advertising tool.

12. The computer readable medium of claim 11, wherein the product advertisement tool comprises an advertising service for advertising on a cost-per-click basis.

13. The computer readable medium of claim 11, further comprising instructions operative to:
presenting a plurality of modules to the user over the network, each module including access to at least one of the control panels of the plurality of control panels.

14. The computer readable medium of claim 13, wherein a module of the plurality of modules comprises one selected from the group consisting of a store management module, a web hosting module, or a mail service module, wherein the store management module displays at least one of a shipping status data or an inventory data, the web hosting module provides access to a domain registration system, and the mail service module provides at least one of a tool to create an email address or a tool to create a mailbox.

15. The computer readable medium of claim 11, wherein the area provides the plurality of statistical data items associated with commerce of each web-based storefront identified in the at least one control panel in substantially real time.

16. The computer readable medium of claim 15, wherein the plurality of statistical data items provided in substantially real time comprises at least one of a page view data for each web-based storefront identified in the at least one control panel, a sales data for each web-based storefront identified in the at least one control panel, a click-through rate data for each web-based storefront identified in the at least one control panel, a click trail data for each web based storefront identified in the at least one control panel, or a conversion rate data for each web-based storefront identified in the at least one control panel.

17. The computer readable medium of claim 16, wherein the area displays the plurality of data items in a form comprising at least one a graphical form or a streaming text form.

18. A system for building a control mechanism for aggregately managing a business operated through a plurality of web-based storefronts over a network, the system comprising:
processor means for adding a module to a control mechanism for a business operated through a plurality of web-based storefronts, the module providing access to a plurality of control panels, each control panel providing an interface to create or manage the plurality of web-based storefronts, wherein at least one control panel displays an identifier of each web-based storefront which is active;
processor means for adding an area to the control mechanism, the area visually distinguished from and concurrently displayed with the module, and the area to provide a plurality of statistical data items associated with commerce of each web-based storefront identified in the at least one control panel;
processor means for adding a control panel of the plurality of control panels to the control mechanism, the control panel visually distinct from and concurrently displayed with the module and the area, and the control panel to present a plurality of advertising services for use in promoting each web-based storefront, the plurality of advertising services comprising at least one of a product advertisement tool, a search engine advertisement tool, a sponsor advertising tool, or an e-mail advertising tool advertisement tool, a search engine advertisement tool, a sponsor advertising tool, or an e-mail advertising tool; and
processor means for providing the control mechanism to a user over a network.

19. The system of claim 18, wherein the product advertisement tool comprises an advertising service for advertising on a cost-per-click basis.

20. The system of claim 18, wherein the processor means for adding the module to the control mechanism further comprises processor means for adding a plurality of modules to the control mechanism, each module including access to at least one control panel of the plurality of control panels.

21. The system of claim 20, wherein a module of the plurality of modules comprises at least one of a store management module, a web hosting module, or a mail service module, wherein the store management module displays at least one of a shipping status data or an inventory data, the web hosting module provides access to a domain registration system, and the mail service module provides at least one of a tool to create an email address or a tool to create a mailbox.

22. The system of claim 18, wherein the area provides the plurality of statistical data items associated with commerce of each web-based storefront identified in the at least one control panel in substantially real time.

23. The system of claim 22, wherein the plurality of statistical data items presented in substantially real time comprises at least one of a page view data for each web-based storefront identified in the at least one control panel, a sales data for each web-based storefront identified in the at least one control panel, a click-through rate data for each web-based storefront identified in the at least one control panel, a click trail data for each web based storefront identified in the at least one control panel, or a conversion rate data for each web-based storefront identified in the at least one control panel.

24. The system of claim 23, wherein the area presents the plurality of statistical data items in a form comprising at least one of a graphical form or a streaming text form.

25. A method for building a user interface for managing, in aggregate, a plurality of web-based storefronts over a network, the method comprising:
adding a module to a user interface, the module providing access to a plurality of control panels, each control panel providing an interface to create or manage one of the web-based storefronts, wherein at least one control panel displays an identifier of each web-based storefront which is active,
adding an area to the user interface, the area visually distinguished from and concurrently displayed with the module, and the area providing a plurality of statistical data items associated with commerce of each web-based storefront identified in the at least one control panel;
adding a first control panel of the plurality of control panels to the user interface, the first control panel configured to allow manipulation of a business function of at least one of the plurality of web-based storefronts;
adding a second control panel of the plurality of control panels to the user interface, the second control panel visually distinct from and concurrently displayed with the module and the area, and the second control panel configured to provide a plurality of advertising services for use in promoting each web-based storefront, the plurality of advertising services comprising at least one of a product advertisement tool, a search engine advertisement tool, a sponsor advertising tool, or an e-mail advertising tool advertisement tool, a search engine advertisement tool, a sponsor advertising tool, or an e-mail advertising tool; and providing the user interface to a user over a network.

26. The method of claim 25, wherein the product advertisement tool comprises an advertising service for advertising on a cost-per-click basis.

27. The method of claim 25, wherein the area presents the plurality of statistical data items associated with commerce of each web-based storefront in a form comprising of at least one of a graphical form, a streaming text form, a pictorial form, or a tabular form.

28. The method of claim 25, wherein the first control panel provides access to the business function comprising of at least one of a store management function, a web hosting function, or a mail service function, wherein the store management function displays at least one of a shipping status data or an inventory data, the web hosting function provides access to a domain registration system, and the mail service function provides at least one of a tool to create an email address or a tool to create a mailbox.

29. The method of claim 28, wherein the first control panel further comprises an input selection mechanism configured to communicatively couple with a back end relating to the business function associated with the first control panel.

30. A computer program product for use in conjunction with a computer system, the computer program product comprising a computer readable storage medium and a computer program mechanism embedded therein, the computer program mechanism comprising:

a user interface application for encoding a user interface for use within a web browser for managing a business operated through a plurality of web-based storefronts over a network, the user interface application comprising:

instructions for encoding a module, wherein the module provides access to a plurality of control panels, each control panel providing an interface to create or manage the plurality of web-based storefronts, wherein at least one control panel displays an identifier of each web-based storefront which is active;

instructions for encoding a first area, visually distinguished from and concurrently displayed with the module, the first area for providing a plurality of statistical data items associated with commerce of each web-based storefront identified in the at least one control panel; and instructions for encoding a second area, visually distinguished from and concurrently displayed with the module and the first area, the second area for providing a plurality of advertising services for use in promoting each web-based storefront, the plurality of advertising services comprising at least one of a product advertisement tool, a search engine advertisement tool, a sponsor advertising tool, or an e-mail advertising tool advertisement tool, a search engine advertisement tool, a sponsor advertising tool, or an e-mail advertising tool.

31. The computer program product of claim 30, wherein the module and the first area are displayed on a display of a remote computer.

32. The computer program product of claim 31 wherein the remote computer is associated with the business and runs the web browser.

33. A computer program product for use in conjunction with a computer system, the computer program product comprising a computer readable storage medium and a computer program mechanism embedded therein, the computer program mechanism comprising:

a user interface application for encoding a user interface for use within a web browser for managing a business operated through a plurality of web-based storefronts over a network, the user interface application comprising:

instructions for encoding a module that provides access to a plurality of control panels, each control panel providing an interface to create or manage the plurality of web-based storefronts, wherein at least one control panel displays an identifier of each web-based storefront which is active;

instructions for encoding an area, visually distinguished from and concurrently displayed with the module, the area providing a plurality of statistical data items associated with commerce of each web-based storefront identified in the at least one control panel; and instructions for encoding a control panel of the plurality of control panels, the control panel visually distinct from and concurrently displayed with the module and the area, and the control panel configured to provide a plurality of advertising services for use in promoting each web-based storefront, the plurality of advertising services comprising at least one of a product advertisement tool, a search engine advertisement tool, a sponsor advertising tool, or an e-mail advertising tool advertisement tool, a search engine advertisement tool, a sponsor advertising tool, or an e-mail advertising tool.

34. The computer program product of claim 33, wherein the module, the area, and the control panel are displayed on a display of a remote computer.

35. The computer program product of claim 34, wherein the remote computer is associated with the business and runs the web browser.

36. A first computer for providing a user interface for use within a web browser for managing a plurality of web-based storefronts over a network, the first computer comprising:

a central processing unit;

a memory, coupled to the central processing unit, the memory storing a software application, the software application comprising:

instructions for constructing a module, the module for presenting access to a plurality of control panels, each control panel providing an interface to create or manage one of the web-based storefronts, wherein at least one control panel displays an identifier of each web-based storefront which is active; and instructions for constructing an area, visually distinguished from and concurrently displayed with the module, the area for providing a plurality of statistical data items associated with commerce of each web-based storefront identified in the at least one control panel; and instructions for constructing a control panel of the plurality of control panels, visually distinguished from and concurrently displayed with the module and the area, the control panel for providing a plurality of advertising services for use in promoting each web-based storefront, the plurality of advertising services comprising at least one of a product advertisement tool, a search engine advertisement tool, a sponsor advertising tool, or an e-mail advertising tool advertisement tool, a search engine advertisement tool, a sponsor advertising tool, or an e-mail advertising tool.

37. The first computer of claim 36, wherein the module and the area are displayed on a display on a second computer that is accessible to the first computer over the Internet.

38. The first computer of claim 37, wherein the second computer is associated with a business and wherein said second computer runs a web browser in which the module and the area are displayed.

39. A first computer for providing a user interface for use within a web browser for managing a business operated through a plurality of web-based storefronts over a network, the first computer comprising:

a central processing unit;

a memory, coupled to the central processing unit, the memory storing:

instructions for encoding a module of the user interface, the module providing access to a plurality of control panels, each control panel providing an interface to create or manage a plurality of web-based storefronts for an online business, wherein at least one control panel displays an identifier of each web-based storefront which is active; and instructions for encoding an area of the user interface, visually distinguished from and concurrently displayed with the module, the area providing an information associated with commerce of each web-based storefront identified in the at least one control panel; and instructions for encoding a control panel of the plurality of control panels of the user interface, the control panel visually distinct from and concurrently displayed with the module and the area, and the control panel configured to provide a plurality of advertising services for use in promoting each web-based storefront, the plurality of advertising services comprising at least one of a product advertisement tool, a search engine advertisement tool, a sponsor advertising tool, or an e-mail advertising tool advertisement tool, a search engine advertisement tool, a sponsor advertising tool, or an e-mail advertising tool.

40. The first computer of claim 39, wherein the module, the area and the control panel are displayed on a display of a second computer that is accessible to the first computer over the Internet.

41. The first computer of claim 40, wherein the second computer is associated with the online business and runs the web browser.

* * * * *

UNITED STATES PATENT AND TRADEMARK OFFICE
CERTIFICATE OF CORRECTION

PATENT NO. : 7,627,829 B2  Page 1 of 1
APPLICATION NO. : 10/800128
DATED : December 1, 2009
INVENTOR(S) : Roberts et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1481 days.

Signed and Sealed this

Second Day of November, 2010

David J. Kappos
*Director of the United States Patent and Trademark Office*